United States Patent
Eller et al.

(10) Patent No.: US 12,448,121 B2
(45) Date of Patent: Oct. 21, 2025

(54) ROTOR CONTROL FOR A CONVERTIBLE AIRCRAFT

(71) Applicant: Lockheed Martin Corporation, Bethesda, MD (US)

(72) Inventors: Erez Eller, Plymouth, CT (US); Timothy F. Lauder, Oxford, CT (US); Richard Thomas Hood, Fairfield, CT (US); Frederick John Miner, Barkhamsted, CT (US); Brian Anderson, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 18/441,883

(22) Filed: Feb. 14, 2024

(65) Prior Publication Data
US 2025/0256840 A1 Aug. 14, 2025

(51) Int. Cl.
| | |
|---|---|
| *B64C 27/605* | (2006.01) |
| *B64C 11/32* | (2006.01) |
| *B64C 29/00* | (2006.01) |

(52) U.S. Cl.
CPC ............ *B64C 27/605* (2013.01); *B64C 11/32* (2013.01); *B64C 29/0033* (2013.01)

(58) Field of Classification Search
CPC .... B64C 27/605; B64C 11/32; B64C 29/0033
See application file for complete search history.

(56) References Cited

U.S. PATENT DOCUMENTS

| | | | |
|---|---|---|---|
| 4,669,958 A | 6/1987 | Peyran et al. | |
| 9,950,787 B2 | 4/2018 | Bammer | |
| 10,836,478 B2 * | 11/2020 | Halcom | B64C 27/605 |
| 10,882,611 B2 * | 1/2021 | Foskey | B64C 11/28 |
| 11,255,379 B2 * | 2/2022 | Baskin | B64C 27/32 |
| 11,427,315 B2 * | 8/2022 | Reynolds | B64C 29/0033 |
| 11,738,864 B2 * | 8/2023 | Chando | B64U 10/20 244/7 A |
| 11,753,154 B2 * | 9/2023 | Misiorowski | B64C 29/0016 244/174 |

(Continued)

OTHER PUBLICATIONS

Borri et al., "Inroduction to the Aerospace Mechanics course", Aerospace Mechanics, dated Oct. 4, 2007, pp. 23-24 (37 pages).

(Continued)

*Primary Examiner* — Brian M O'Hara
(74) *Attorney, Agent, or Firm* — Michael Best & Friedrich LLP (57) ABSTRACT

An aircraft includes a body having a fuselage and a wing assembly, a main shaft supported for rotation with respect to the body about a rotor axis, and a blade assembly coupled to the main shaft for corotation therewith. The blade assembly includes a rotor hub and a plurality of blades circumferentially spaced about the rotor hub. Each blade is coupled to the rotor hub for rotation about a respective blade axis. The aircraft includes a pitch control system coupled to the blade assembly to rotate each blade about the respective blade axis. The pitch control system includes a slider, a swashplate, a first actuator coupled to the slider, and a second actuator operable to rotate the swashplate assembly with respect to the slider.

19 Claims, 8 Drawing Sheets

(56) References Cited

U.S. PATENT DOCUMENTS

| | | | | |
|---|---|---|---|---|
| 2016/0101851 A1* | 4/2016 | Hoyle | ................... | B64C 27/605 416/1 |
| 2018/0290740 A1* | 10/2018 | Darrow, Jr. | ............. | B64C 27/10 |

OTHER PUBLICATIONS

Fenny et al., "Design & Development of The Ba 609 Civil Tiltrotor Hydraulic System Architecture", Accessed on May 13, 2024, Fig. 10 (21 pages).

* cited by examiner

ROTOR CONTROL FOR A CONVERTIBLE AIRCRAFT

FIELD OF INVENTION

Embodiments described herein relate to control systems for rotor assemblies, and specifically pitch control systems for rotor systems of aircraft.

BACKGROUND

Aircraft, and specifically vertical take-off and landing (VTOL) aircraft, utilize thrusters (e.g., a rotor system) to provide lift, control, and thrust during flight operations. A convertible VTOL aircraft, such as a tiltrotor, tail-sitter, or tiltwing aircraft, is capable of both thruster powered flight, in which thrusters provide a combination of lift, control, and thrust, and wing powered flight, in which aerodynamic profiles (for example, the airfoils of the wings) provide the lift and the thrusters primarily provide thrust and control. The thrusters (e.g., rotors, propellers, etc.) may include a blade assembly capable of variable blade pitch control. The blade pitch may be controlled by a pitch control system. Typical control systems used on fly-by-wire VTOL aircraft electronically process control input (e.g., from a pilot in a cockpit) and transmit an electronically mixed control signal to a common set of actuators configured to achieve both collective pitch control and cyclic pitch control of the blade assembly, for example by adjusting the length of each actuator individually to control the position and orientation of a swashplate. Systems for adjusting collective pitch especially require high stiffness, reliability, and resolution to enable the accurate pitch control that is required by some aircraft configurations, particularly convertible aircraft configurations. However, conventional methods using common actuators can reduce sensitivity, introduce slop, add weight, and increase maintenance costs. Additionally, typical control systems with common actuators can create off-axis loads that increase friction and sticking during pitch change operations.

SUMMARY

Embodiments described herein provide an aircraft including a body having a fuselage and a wing assembly, a main shaft supported at the body for rotation with respect to the body about a rotor axis, and a blade assembly coupled to the main shaft for corotation therewith. The blade assembly includes a rotor hub and a plurality of blades circumferentially spaced about the rotor hub. Each blade is coupled to the rotor hub for rotation about a respective blade axis. The aircraft includes a pitch control system coupled to the blade assembly to rotate each blade about the respective blade axis. The pitch control system includes a slider, a swashplate, a first actuator and a second actuator. The slider is coupled to the main shaft for translation along the rotor axis. Translation of the slider rotates each blade about the respective blade axis by an equal amount. The swashplate assembly is coupled to the slider for rotation about a tilt axis substantially perpendicular to the rotor axis. Rotation of the swashplate assembly about the tilt axis rotates each blade about the respective blade axis by a different amount. The first actuator is coupled to the slider and includes a first link pivotally coupled to the body, a pivot link pivotally coupled to the body and having a pivot point movable with respect to the body, and a lever arm rotatably coupled to the pivot link for rotation about the pivot point according to movement of the first link. The second actuator is operable to rotate the swashplate assembly with respect to the slider. The second actuator includes a second link pivotally coupled to the slider and pivotally coupled to the swashplate assembly. The first link is configured to vary a length thereof to rotate the lever arm about the pivot point and translate the slider along the rotor axis. The second link is configured to vary a length thereof to rotate the swashplate assembly about the tilt axis.

A pitch control system is configured to change a pitch of a blade assembly mounted on a main shaft for rotation about a rotor axis. The pitch control system includes a slider configured to couple to the main shaft for translation along the rotor axis, a slider actuator operable to translate the slider with respect to the main shaft, a swashplate assembly coupled to the slider for rotation about a tilt axis substantially perpendicular to the rotor axis, and a swashplate actuator operable to rotate the swashplate assembly with respect to the slider. The slider actuator is mounted between a fixed body and the slider. The swashplate actuator is mounted between the slider and the swashplate assembly. The slider actuator and the swashplate actuator are independently operated.

Other aspects will become apparent by consideration of the detailed description and accompanying drawings.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

Figure 1:
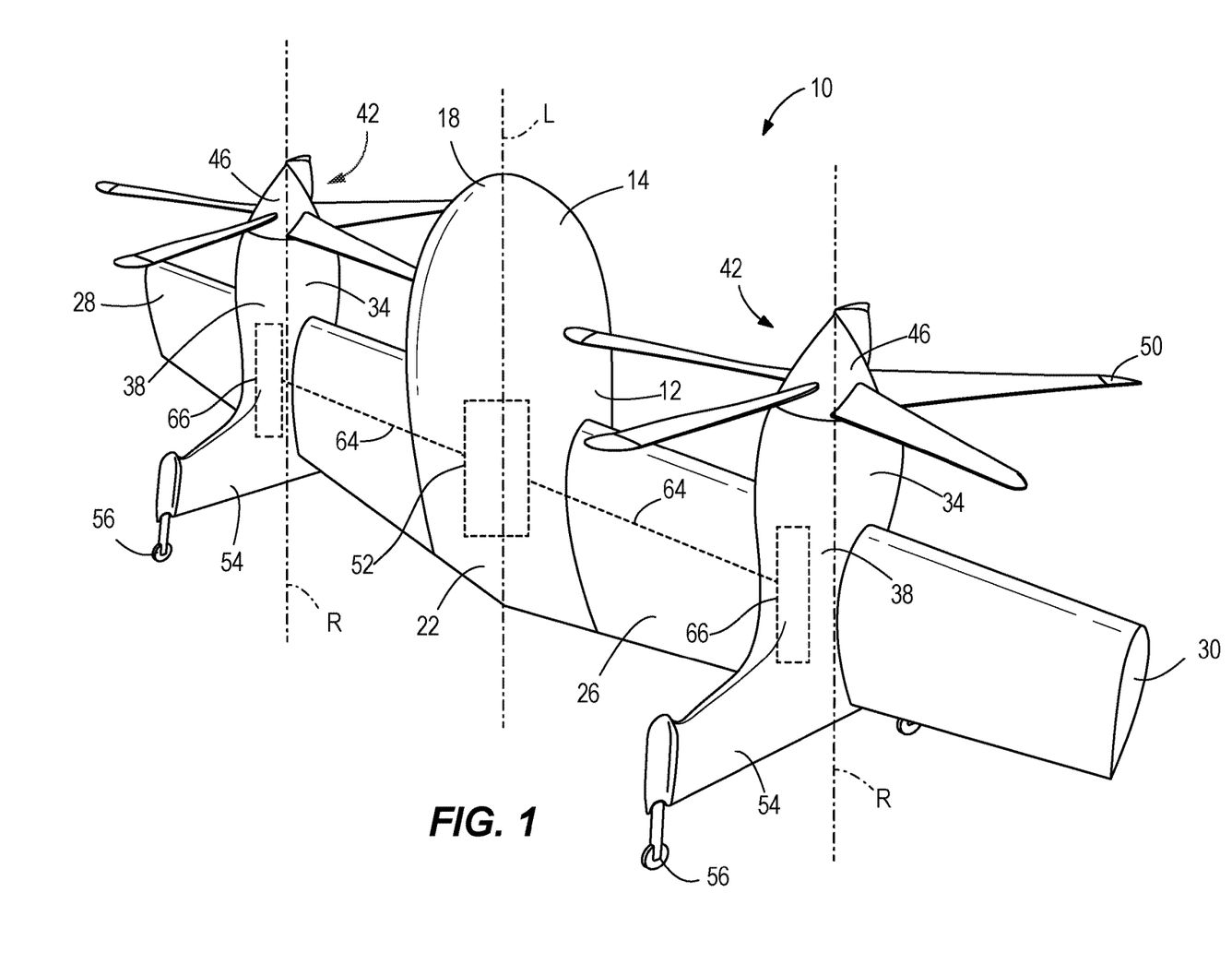
FIG. 1 illustrates an aircraft according to an exemplary embodiment in a first mode that may be used during take-off and hover operations.
Figure 2:
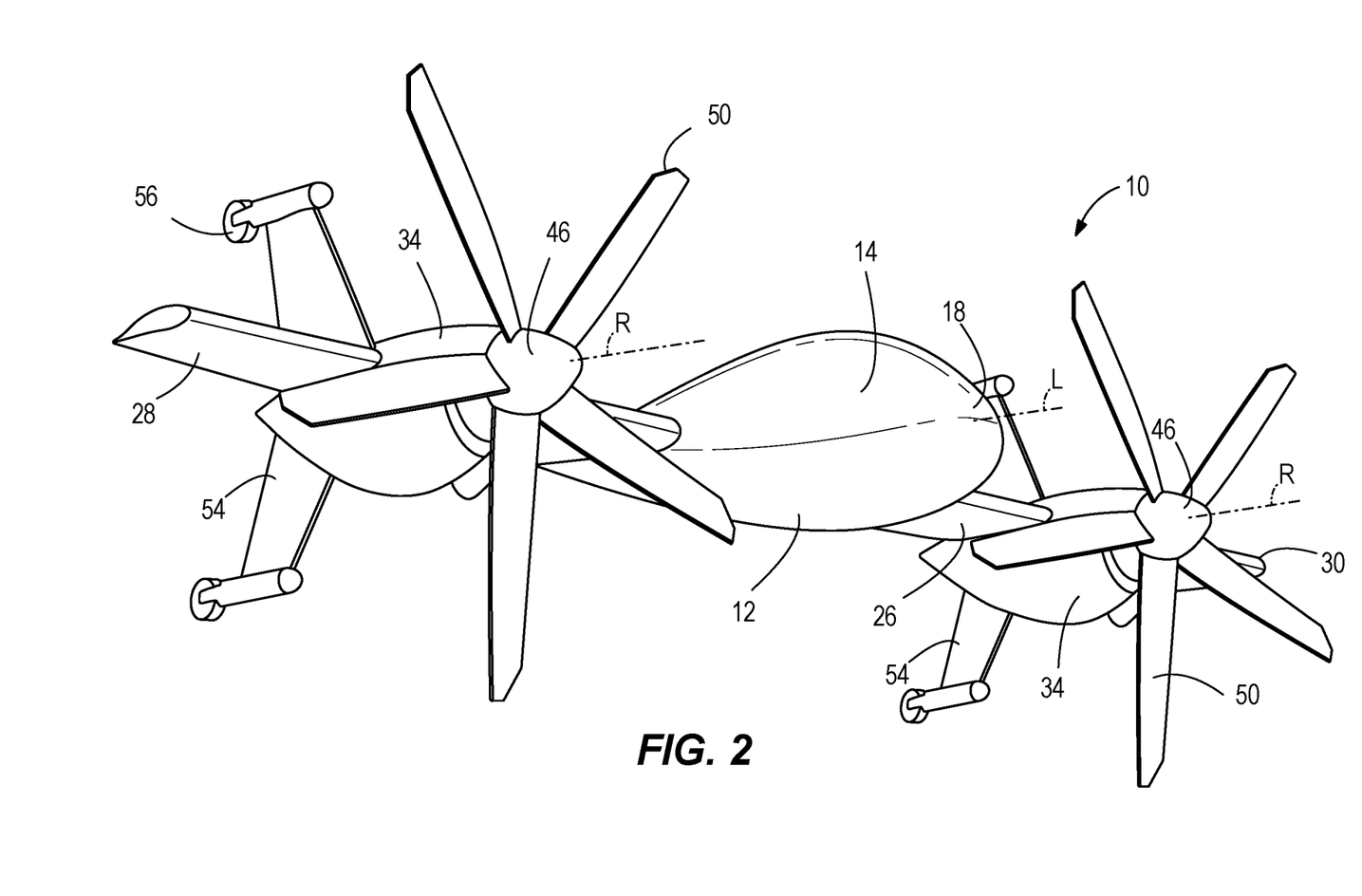
FIG. 2 illustrates the aircraft of FIG. 1 in a second mode that may be used for forward flight operations.

FIGS. 1 and 2 illustrate a vertical take-off and landing (VTOL) aircraft 10. The aircraft 10 is a convertible aircraft capable of rotor or thruster powered flight and wing powered flight. In the illustrated embodiment, the aircraft 10 is a tail-sitter aircraft. The aircraft 10 is exemplary and the teachings included herein can be incorporated into other types of convertible aircraft or other types of VTOL rotorcraft. The aircraft 10 includes a body 12 having a fuselage 14 extending along a longitudinal axis L between a nose 18 and a base 22, and a wing assembly 26 coupled to extend from the fuselage 14 transverse to the longitudinal axis L. In the illustrated embodiment, the aircraft 10 is symmetrical and the wing assembly 26 includes a first wing 28 and a second wing 30 positioned on an opposite side of the fuselage 14 from the first wing 28.

The aircraft 10 may be referred to using directional terminology including referring to a direction along the longitudinal axis L toward the nose 18 as a forward direction or toward the front and a direction along the longitudinal axis L toward the base 22 as a rearward direction or toward the rear. Directions leading away from the longitudinal axis L may be referred to as outward or distal and directions leading toward the longitudinal axis L may be referred to as inward or proximal. This terminology is not intended to be limiting and is merely used for the sake of description.

With reference to FIG. 1, the aircraft 10 includes thrusters 34 coupled to the wing assembly 26 to provide lift and thrust to the aircraft 10. In this context, a thruster is a component or group of components capable of generating forces and moments to provide the aircraft with a means of thrust, lift, and/or control. In the illustrated embodiment, the first wing 28 and the second wing 30 of the aircraft 10 each include a thruster 34 coupled thereto. In some embodiments, the aircraft 10 includes multiple thrusters 34 on each wing 28, 30. In some embodiments, the aircraft 10 additionally or alternately includes one or more thrusters 34 on the fuselage 14. In the illustrated embodiment, the thrusters 34 each include an outer housing 38 (also referred to herein as a nacelle 38) supporting a rotor system 42. The rotor system 42 includes a blade assembly 46, also referred to herein as a rotor head assembly 46, supported at a front end of the nacelle 38 and configured to rotate about a rotor axis R. In some embodiments, the rotor system 42 may include multiple blade assemblies 46. The blade assembly 46 includes rotor hub 82 (FIG. 5) and a plurality of blades 50. Rotation of the blades 50 about the rotor axis R generates lift, thrust, and moments or a combination thereof that fly and control the aircraft 10 based on a pitch of the blades 50. Each of the blades 50 is rotatable relative to the rotor hub 82 about a respective blade axis B (FIG. 5) to create pitch. The rotor system 42 further includes a drivetrain 64 connecting the rotor head 46 to a prime mover 52. The prime mover 52 may be an engine or other type of generator capable of transmitting rotation to the rotor systems 42. The drivetrain 64 includes at least one gearbox 66 and one or more other gearboxes, transmissions, or other parts capable of transferring power from the prime mover 52 to the rotor head 46. In the illustrated embodiment, the prime mover 52 is positioned in the fuselage 14 of the aircraft 10 and provides power to both thrusters 34 to rotate the blade assemblies 46. A portion of the drivetrain 64 extends through the wings 28, 30 to connect the prime mover 52 with the thrusters 34. Many configurations are possible and the illustrated configuration is provided as an example only. For example, in some embodiments, the aircraft 10 may include multiple prime movers 52 and/or may include dedicated prime movers 52 for each thruster 34. In some embodiments the prime mover(s) 52 may be positioned elsewhere on the aircraft 10, for example, in the wing assembly 26 or partially or entirely surrounded by the nacelle 38 of one of the thrusters 34. Still further configurations may be used.

With continued reference to FIG. 1, the nacelle 38 of each thruster 34 surrounds the rotor system 42 to protect the internal components from the environment. The nacelle 38 has an aerodynamic outer shape or profile to minimize drag along the longitudinal axis L of the aircraft 10. As referenced above, in the illustrated embodiment, the aircraft 10 is a tail-sitter type aircraft and the aircraft 10 includes tail fins 54 extending rearwardly and laterally outwardly from the wing assembly 26 to create a wide base. The tail fins 54 are each equipped with one or more retractable landing gears 56 configured to engage a ground surface to support the aircraft 10 in an upright orientation when the aircraft 10 is grounded, as shown in FIG. 1. In the illustrated embodiment, the aircraft 10 includes two of the tail fins 54, each aligned with one of the thrusters 34 and extending from the nacelle 38 thereof to create a continuous and aerodynamic outer profile. In other embodiments, the aircraft 10 may include more tail fins 54 and the tail fins 54 may be spaced from the nacelles 38 along the wing assembly 26.

The aircraft 10 is operable in a first mode, shown in FIG. 1, and a second mode, shown in FIG. 2. In the first mode, the aircraft 10 is in the upright orientation and the longitudinal axis L extends generally vertically. The first mode may be a thruster powered flight mode and the thrusters 34 may be operated to provide a combination of lift and thrust. The first mode may be used to allow the aircraft 10 to take off and land vertically, and to hover in the upright orientation. In the first mode, the thrusters 34 provide all or almost all the lift and thrust to the aircraft 10. In the second mode, the aircraft 10 is in a level orientation and the longitudinal axis L extends generally horizontally. The second mode may be a wing powered flight mode and the thrusters 34 may be operated to provide additional thrust and balance to the aircraft 10. The majority of the lift comes from the aerodynamic profile of the body 12 of the aircraft 10, primarily the wing assembly 26 with additional lift from the fuselage 14. The second mode may be used to allow the aircraft 10 to perform forward flight operations.

Figure 3:
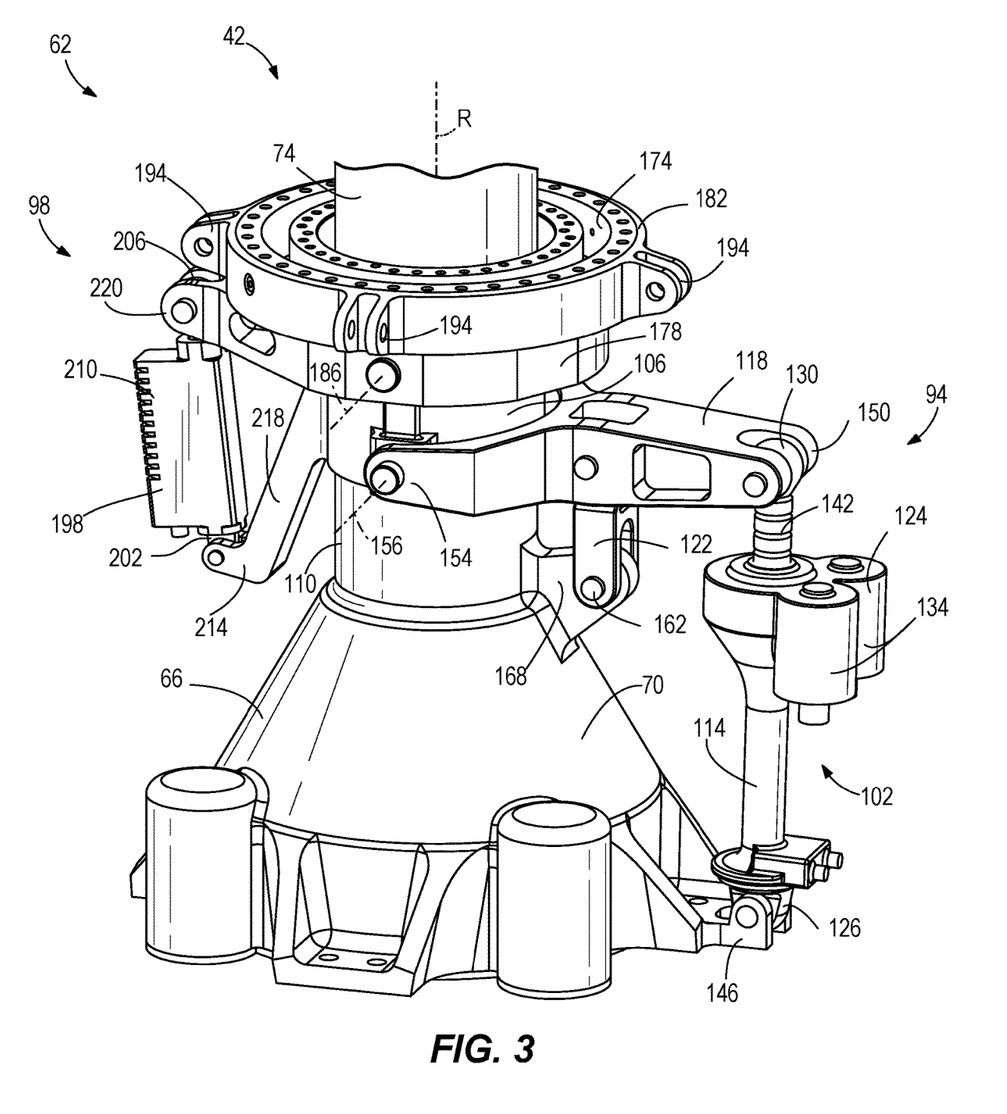
FIG. 3 is a perspective view of a rotor system for use with the exemplary aircraft of FIG. 1, the rotor system including a pitch control system.

With reference to FIG. 3, the rotor system 42 of one of the thrusters 34 is illustrated in more detail. As discussed above, the rotor system 42 includes a drivetrain that couples the blade assembly 46 to the prime mover 52. In the illustrated embodiment, the gearbox 66 is positioned within the nacelle 38 and the gearbox 66 includes a gearbox casing 70 and one or more gear mechanisms or transmissions (not shown) positioned within the casing 70 and rotatably driven by the prime mover 52. The gear mechanisms may scale the speed and torque before transmitting the rotation to an output, such as a main shaft 74. The main shaft 74 extends along the rotor axis R to a forward end 78 (FIG. 5) and is supported in the casing 70 by bearings (not shown) for rotation about the rotor axis R. The rotor head 46 is supported on the forward end 78 of the main shaft 74.

Figure 4:
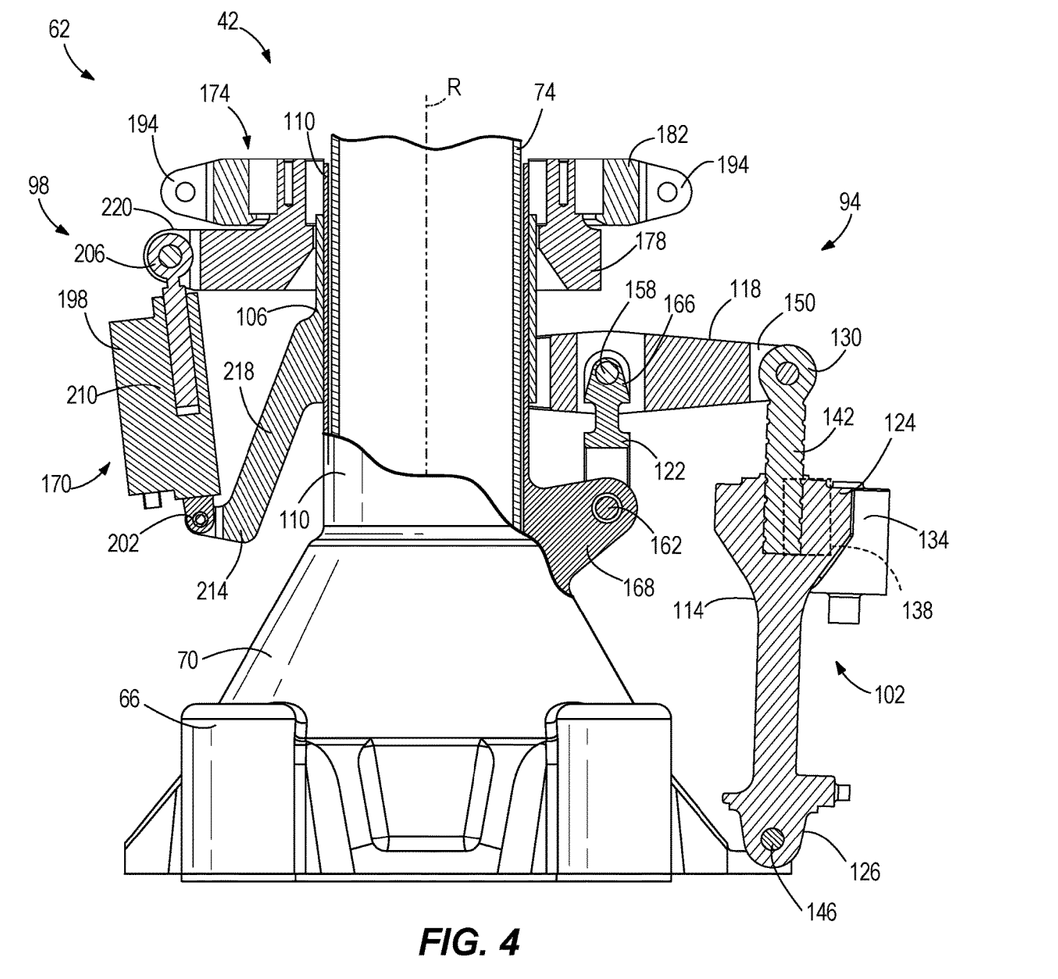
FIG. 4 is a cross-sectional view of the rotor system of FIG. 3.
Figure 5:
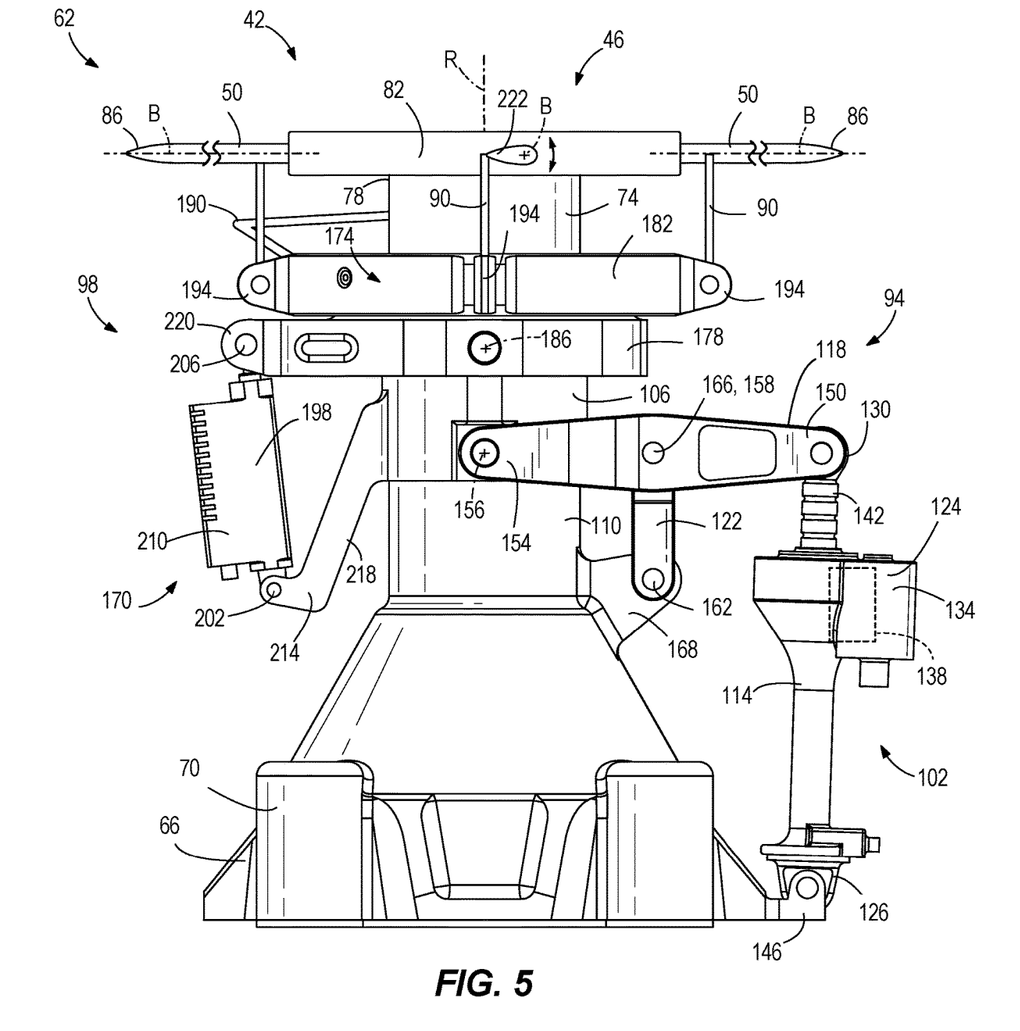
FIG. 5 is a side view of the rotor system of FIG. 3, the rotor system including a rotor head (illustrated schematically), and with the pitch control system in a neutral configuration.

Turning to FIG. 3-5, the rotor systems 42 of the thrusters 34 are variable pitch rotors that can vary the amount and direction of force provided to the aircraft 10 by changing a pitch of the blade assembly 46. The overall pitch of the blade assembly 46 is controlled by an associated pitch control system 62 that rotates the blades 50 to change a blade pitch thereof. The pitch control system 62 may be part of or connected to a larger rotor control system and/or a larger aircraft control system 300 (FIG. 8) that is capable of controlling the rotation speed and additional characteristics of the rotor system 42 not affected by the pitch control system 62. The pitch control system 62 includes a collective control assembly 94 and a cyclic control assembly 98, which are independently operable to rotate the blades 50 and change the pitch of the blade assembly 46.

The collective control assembly 94 includes a first actuator 102 and a slider 106. The slider 106, also referred to herein as a collective slider 106, is supported on a slider guide inside the nacelle 38 to translate with respect to the blade assembly 46 along the rotor axis R. In the illustrated embodiment, the slider 106 is generally cylindrical and is mounted to a cylindrical upper portion 110 of the casing 70 by bearings (not shown) to surround the main shaft 74. The main shaft 74 extends within the upper portion 110 of the casing 70 and the upper portion 110 and the slider 106 are coaxial with the shaft 74 and the rotor axis R. In some embodiments, the slider 106 is coupled directly to the main shaft 74 by bearings for translation along the main shaft 74. The slider 106 is a non-rotating component and is fixed against rotation about the rotor axis R with respect to the body 12 of the aircraft 10. In some embodiments, the slider guide, in this case the upper portion 110, may include a track or groove to prevent rotation of the slider 106. In some embodiments, the slider 106 is prevented from rotating by the lever arm 118 and pivot link 122 of the first actuator 102. The main shaft 74 therefore rotates with respect to the slider 106. Movement of the slider 106 along the rotor axis R alters the pitch of the blade assembly 46 collectively, or causes a collective pitch change.

With continued reference to FIGS. 3-5, in the illustrated embodiment, the first actuator 102 is coupled between the casing 70 of the gearbox 66 and the slider 106. In some embodiments, the first actuator 102 may be coupled between the slider 106 and another fixed part of the aircraft. The first actuator 102 is operable to move the slider 106 along the rotor axis R and may also be referred to as the collective actuator or the slider actuator. The first actuator 102 includes a first link 114, a lever arm 118, and a pivot link 122. The first link 114 includes a first electro-mechanical actuator 124 (EMA). The first EMA 124 is operable to change a length of the first link 114, or in other words, to change the distance between a first end 126 and a second end 130 of the first link 114. The first EMA 124 may be operated to expand (i.e., increase the length of the first link 114 and increase the distance between the first end 126 and the second end 130) or to retract (i.e., decrease the length of the first link 114 and decrease the distance between the first end 126 and the second end 130). The first EMA 124 may be any type of actuator capable of varying a length thereof (e.g., linear, rotary, etc.). In the illustrated embodiment, the first EMA 124 includes one or more motors 134 configured to rotate, a transmission 138 that converts rotation from the motor(s) 134 into translation, and an output shaft 142 that translates in response to rotation of the motors 134. The transmission 138 may include a ball screw, a lead screw, a belt drive, or any other mechanism for converting rotation to translation. In some embodiments, the motors may be oriented so that an axis of rotation is parallel to the first link 114 and the direction of expansion. In other embodiments, the motors may be oriented so that the axis of rotation is perpendicular to the first link and the direction of expansion. The motors 134 may be operable in forward and reverse to expand and retract the first EMA 124. In the illustrated embodiment, the first EMA 124 is oriented with the output shaft 142 extending forward and an end of the output shaft 142 forms the second end 130 of the first link 114. In other embodiments, other orientations or configurations may be used.

In the illustrated embodiment, the first end 126 of the first link 114 is coupled to a first mounting point 146 on the gearbox 66. In some embodiments, the first end 126 connects to another fixed portion of the aircraft 10, such as the body 12, an inner frame, or other structure within the nacelle 38 or of the body 12. The first mounting point 146 is a pivot bracket with aligned openings integrally formed in the casing 70 of the gearbox 66. The first end 126 is pivotally coupled to the first mounting point 146 (e.g., by a pin). Thus, the first link 114 is rotatable with respect to the gearbox 66 about the first mounting point 146. The second end 130 of the first link 114 is pivotally coupled to the lever arm 118.

With continued reference to FIGS. 3-5, the lever arm 118 is coupled between the first link 114 and the slider 106 to transmit movement of the first link 114 to the slider 106 to move the slider 106 along the rotor axis R. The lever arm 118 extends between a first lever end 150 and a second lever end 154. The first lever end 150 is pivotally coupled to the second end 130 of the first link 114 (e.g., by a pin) so that the lever arm 118 rotates with respect to the first link 114 about the second end 130. The second lever end 154 is pivotally coupled to the slider 106, to allow rotation of the lever arm 118 with respect to the slider 106. As seen best in FIG. 3, the lever arm 118 is 'fork' shaped and partially surrounds the slider 106. In other words, the second lever end 154 is U-shaped and split into two branches that are positioned on either side of the slider 106. The second lever end 154 is coupled to the slider 106 on either side (e.g., by a pair of pins) for rotation about a slider pivot axis 156 that intersects the rotor axis R. The slider pivot axis 156 is perpendicular to the rotor axis R.

As best seen in FIG. 4, the lever arm 118 further includes a fulcrum point 158 about which the lever arm 118 rotates. The fulcrum point 158 (also referred to herein as the pivot point 158) is positioned between the first lever end 150 and the second lever end 154. In the illustrated embodiment, the fulcrum point 158 is approximately centered along the length of the lever arm 118. In other embodiments, the fulcrum point 158 may be positioned at other locations between the first lever end 150 and the second lever end 154 and the position may be selected to achieve a desired mechanical advantage, for example, to achieve a desired range of motion of the slider 106 given the capabilities of the selected EMA. The lever arm 118 and the provided mechanical advantage also allows the system to be optimized for precision, for power, or for range based on the specific needs of the situation. For example, typically, an EMA with a larger stroke length allows for more precise control but loses power (i.e., applies a smaller force). The design of the first actuator 102 allows for a more powerful EMA (with a smaller stroke length) to achieve a larger range of motion of the slider 106 with sufficient power to move the slider 106.

The pivot link 122 is coupled between the lever arm 118 and the gearbox 66 to support rotation of the lever arm 118 about the fulcrum point 158. The pivot link 122 extends between a first link end 162 and a second link end 166. The first link end 162 is pivotally coupled to a second mounting point 168 on the gearbox 66. The second mounting point 168 is similar to the first mounting point 146 and includes a pivot bracket with aligned openings, integrally formed in the casing 70 of the gearbox 66. In other embodiments, the pivot bracket may be otherwise coupled to the gearbox 66, the bracket may be of another type, and/or the second mounting point 168 may be coupled to another fixed part of the aircraft 10 other than the gearbox 66. The first link end 162 of the pivot link 122 is pivotally coupled to the second mounting point 168 (e.g., by a pin) to rotatably couple the pivot link 122 to the gearbox 66. The second link end 166 is pivotally coupled to the fulcrum point 158 of the lever arm 118 (e.g., by a pin) to rotatably mount the lever arm 118 to the pivot link 122. In the illustrated embodiment, the links in the first actuator 102 are all coplanar, and all of the pivot axes are parallel to each other, and perpendicular to the rotor axis R.

With reference to FIGS. 3-5, the cyclic control assembly 98 includes a second actuator 170 and a swashplate assembly 174. The swashplate assembly 174 is pivotally coupled to the slider 106 and is mounted thereon for translation along the rotor axis R with the slider 106. The swashplate assembly 174 includes a lower swashplate 178 and an upper swashplate 182 coupled to the lower swashplate 178. The lower and upper swashplates 178, 182 are generally annular and include central channels, and are positioned to surround the slider 106 and the main shaft 74. The lower swashplate 178 is pivotally coupled to the slider 106 (e.g., by a pair of pins) for rotation about a tilt axis 186. The tilt axis 186 extends perpendicular to and intersects the rotor axis R. In the illustrated embodiment, the tilt axis 186 is parallel to the slider pivot axis 156, however, in some embodiments the slider pivot axis 156 may be rotated about the rotor axis R with respect to the tilt axis 186. The upper swashplate 182 is coupled to the lower swashplate 178 to rotate therewith about the tilt axis 186 with respect to the slider 106 and the main shaft 74. The lower swashplate 178, also referred to as the stationary swashplate, is a non-rotating component and does not rotate with the main shaft 74 about the rotor axis R. The lower swashplate 178 is fixed to the slider 106 by the second actuator 170 such that the main shaft 74 rotates with respect to the lower swashplate 178. The upper swashplate 182, also referred to as the rotating swashplate, is a rotating component and is fixed to rotate with the main shaft 74 about the rotor axis R. The upper swashplate 182 is coupled to the lower swashplate 178 by bearings or bushings allowing rotation therebetween. In the illustrated embodiment, the upper swashplate 182 is driven to co-rotate with the main shaft 74 by a rotating scissor 190 (FIG. 5). The rotating scissor 190 is illustrated as engaging the main shaft 74 directly, but in other embodiments may engage the rotor hub 82 or other rotating components of the rotor system 42 to transmit rotation to the upper swashplate 182. The upper swashplate 182 is coupled to the blades 50 of the blade assembly 46 by pitch control rods 90, which are coupled between anchor points 194 spaced about the upper swashplate 182. Thus, the upper swashplate 182 is mounted to the lower swashplate 178 to rotate with respect to the lower swashplate 178 and to tilt with the lower swashplate 178 about the tilt axis 186. Tilting of the swashplate assembly 174 about the tilt axis 186 moves the pitch control rods 90 unevenly and changes the pitch of the blade assembly 46 cyclically, or, in other words, creates a cyclic pitch change of the blade assembly 46.

With continued reference to FIGS. 3-5, the second actuator 170 of the cyclic control assembly is coupled between the swashplate assembly 174 and the slider 106 to control tilting of the swashplate assembly 174 about the tilt axis 186. The second actuator 170 may also be referred to as the cyclic actuator or the swashplate actuator. The second actuator 170 includes a second link 198 extending between a first end 202 and a second end 206 and including a second EMA 210. The second EMA 210 can similarly be any type of actuator capable of varying a length thereof such that the second EMA 210 operates similarly to the first EMA 124 and is expandable and retractable to change a length of the second link 198 (i.e., a distance between the first end 202 and the second end 206). The second EMA 210 may be a similar actuator to the first EMA 124 or may be an actuator of a different type. In the illustrated embodiment, the second EMA 210 includes one or more motors configured to rotate, a transmission that converts rotation from the motor(s) into translation, and an output shaft that translates in response to rotation of the motors. The second EMA 210 and the first EMA 124 may include different properties or characteristics and may each be selected to provide the specific output needed for the respective assembly. For example, in embodiments with a motor and transmission, the EMAs may include different mechanical resolutions (e.g., measured by translation distance per rotation of motor), different electrical resolutions (e.g., measured by degrees of rotation per step/electronic signal input), different output torques, and/or different output speeds. In other embodiments, the EMAs may also have different ranges of translation, different sizes, different weights, etc.

The first end 202 of the second link 198 is coupled to the slider 106. In the illustrated embodiment, the first end 202 is pivotally coupled (e.g., by a pin) to a pivot bracket formed in a lower end 214 of a leg bracket 218 of the slider 106. In the illustrated embodiment, the leg bracket 218 is integrally formed with the slider 106 and extends out and downward from a main portion of the slider 106. In some embodiments, the leg bracket 218 is otherwise coupled to the slider 106 to translate therewith. The pivotal coupling between the first end 202 and the leg bracket 218 allows the second link 198 to rotate with respect to the slider 106. The second end 206 of the second link 198 is coupled to the lower swashplate 178 of the swashplate assembly 174. In the illustrated embodiment, the second end 206 is pivotally coupled to a pivot bracket 220 formed on the lower swashplate 178 to rotatably couple the second link 198 to the swashplate assembly 174. The pivot bracket 220 is spaced from the tilt axis 186 so that movement of the second end 206 applies a torque that tilts the swashplate assembly 174.

Turning to FIG. 5, the blade assembly 46 is coupled to the forward end 78 of the main shaft 74 for corotation therewith about the rotor axis R to generate the aerodynamic forces applied to the aircraft 10. The rotor hub 82 is fixed to the forward end 78 of the main shaft 74 and the plurality of blades 50 are circumferentially spaced about the rotor hub 82. The plurality of blades 50 are spaced evenly and each blade 50 extends from a base end, coupled to the rotor hub 82, to a distal end 86 along a blade axis B. The blade axis B is sometimes referred to as a feathering axis B. Each blade 50 is supported on the rotor hub 82 for rotation about its respective blade axis B. The blade assembly 46 is illustrated schematically in FIG. 5, and the specific profiles, relative sizes and dimensions, and 3D configurations (such as twist) of the blades 50 are not limited to those shown in the figures.

As discussed above, the blade assembly 46 has a variable pitch, and the direction and amount of the force and moment generated by the blade assembly 46 is controlled by the pitch of the blades 50. Specifically, each blade 50 may have a variable blade pitch and may be rotated about the respective axis B to change the respective blade pitch. The pitch control system 62 is configured to vary the overall pitch of the blade assembly 46 by rotating the blades 50. Each blade 50 is coupled to the pitch control system 62 by the pitch control rods 90 secured to the blade 50 adjacent the rotor hub 82 and movement of each pitch control rod 90 changes the blade pitch of the connected blade 50. The pitch control rods 90 are each eccentrically coupled to the respective blade 50 (e.g., connect at a mounting point offset from the blade axis B) so that movement of each pitch control rod 90 along the rotor axis R causes the blade 50 connected thereto to rotate about the blade axis B. The pitch control rods 90 are coupled to anchor points 194 on the upper swashplate 182 to rotate with the upper swashplate 182 about the rotor axis R and match the rotation of the blade assembly 46. In FIG. 5, the pitch control rods 90 are schematically shown as coupled to the blade 50 adjacent to the rotor hub 82 and are shown as offset from the blade axis B toward a trailing end 222 of the blade 50. In other embodiments, the pitch control rods 90 may be coupled to the blade 50 in other locations or in other ways.

The pitch control system 62 is operable to change the pitch of the blade assembly 46 collectively (i.e., perform a collective pitch change operation) and to change the pitch of the blade assembly 46 cyclically (i.e., perform a cyclical pitch change operation). In the collective pitch change, each of the blades 50 is rotated about its blade axis B by an equal amount such that the blade pitch of each blade 50 is uniformly varied. Specifically, translation of the slider 106 along the rotor axis R translates the control rods 90 simultaneously along the rotor axis R, changing the blade pitch of each blade 50 by a uniform amount. In a cyclic pitch change, each of the blades 50 is rotated about the blade axis B by a different amount based on the respective circumferential position of the blade 50 about the rotor hub 82, such that the blade pitch of each blade 50 varies differentially. Specifically, tilting the swashplate assembly 174 moves the control rods 90 along the rotor axis R differentially or unevenly, changing the blade pitch of each blade 50 by a different amount.

In operation, the pitch control system 62 operates the first actuator 102 and the second actuator 170 to vary the pitch of the blade assembly 46 and thereby vary the direction and amount of force and moment provided to the aircraft 10.

Figure 6:
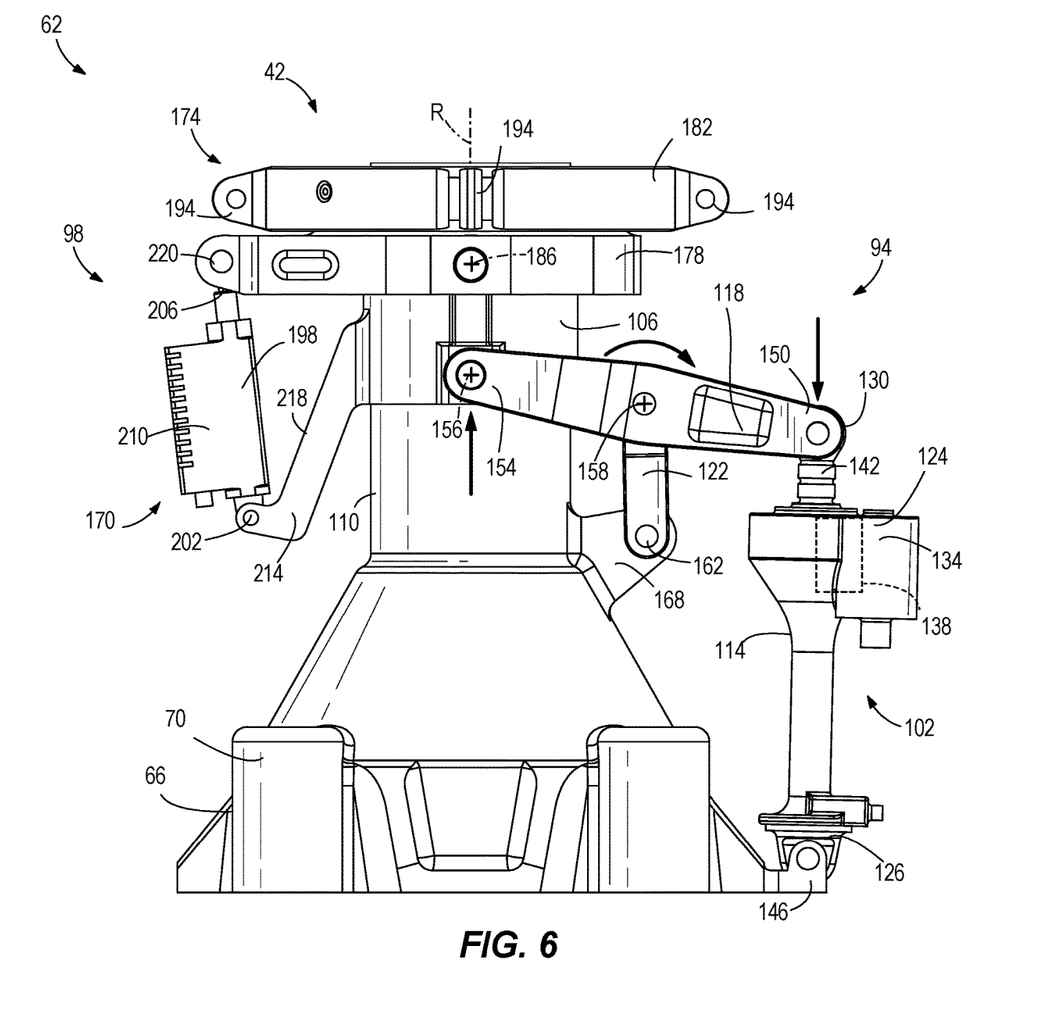
FIG. 6 is a side view of the rotor system of FIG. 3 illustrating the pitch control system during a collective pitch change.

With reference to FIG. 6, to perform a collective pitch control operation, the pitch control system 62 operates the collective control assembly 94, and specifically actuates the first actuator 102. In one example, the first EMA 124 is actuated to retract and the length of the first link 114 is decreased. In the illustrated embodiment, the actuation may include operating the motor(s) 134 to rotate, converting the rotation to translation through the transmission 138 such that the output shaft 142 is driven to translate (e.g., downward in FIG. 6). The first end 126 of the first link 114 is coupled to the gearbox 66 so the decrease in length of the first link 114 drives the second end 130 to move the first lever end 150 of the lever arm 118 downward. The lever arm 118 is coupled to the pivot link 122 at the fulcrum point 158, and movement of the first lever end 150 causes the lever arm 118 to rotate about the fulcrum point 158 so the second lever end 154 moves in a direction generally opposite the direction of the first lever end 150. The second lever end 154 is coupled to the slider 106 and is therefore constrained to travel in a linear path parallel to the rotor axis R. The pivot link 122 is pivotally coupled to the gearbox 66 such that the fulcrum point 158 is configured to travel along an arced path. Thus, the pivot connections of the gearbox and the pivot link 122 and first link 114 allow for lateral deflection of the lever arm 118 and a lever force transmitted to the slider 106 is applied in the direction of translation of the slider 106 (along the rotor axis R). The movement of the second lever end 154 applies the force to the slider 106 and moves the slider 106 along the rotor axis R toward the blade assembly 46. Movement of the slider 106 is transmitted to the swashplate assembly 174 via the pivot connection along the tilt axis 186, and the swashplate assembly 174 is carried with the slider 106 toward the blade assembly 46. The pitch control rods 90 are therefore also moved toward the blade assembly 46 and rotate the blades 50 about the blade axis B.

In the illustrated embodiment, expansion of the first EMA 124 causes the trailing end 222 of each blade 50 to lift. In other embodiments, other configurations may be used such that expansion of the first EMA 124 results in a lowering of the trailing end 222. Depending on the orientation of the aircraft 10 and the swashplate assembly 174, the blade assembly 46 may generate a force based on the pitch of the blades 50 and the force may provide lift or thrust to the aircraft 10. The pitch control rods 90 are all moved simultaneously with the slider 106 and each blade 50 is rotated by an equal amount. As the slider 106 translates, the swashplate 174 is carried with the slider 106 by the pinned connection at the tilt axis 186. The second actuator 170 is also carried with the slider 106 and the swashplate assembly 174. If the second actuator 170 is not activated, the length of the second link 198 remains unchanged and the translation of the slider 106 is transmitted evenly to the swashplate assembly at the pinned connection and at the pivot bracket 220 where the second actuator 170 connects. Thus, the swashplate assembly 174 does not rotate about the tilt axis 186. In other words, the cyclic pitch of the blade assembly 46 is maintained with no activation of the second actuator 170. The second actuator 170 prevents the swashplate assembly 174 from rotating with respect to the slider 106 and maintains the orientation of the swashplate assembly 174 with respect to the blade assembly 46 without being activated or operated.

The pitch of the blade assembly 46 can thus be collectively adjusted by retracting the first EMA 124, driving the lever arm 118 to rotate and moving the slider 106 toward the blade assembly 46, rotating the trailing ends 222 about the blade axis B.

Figure 7:
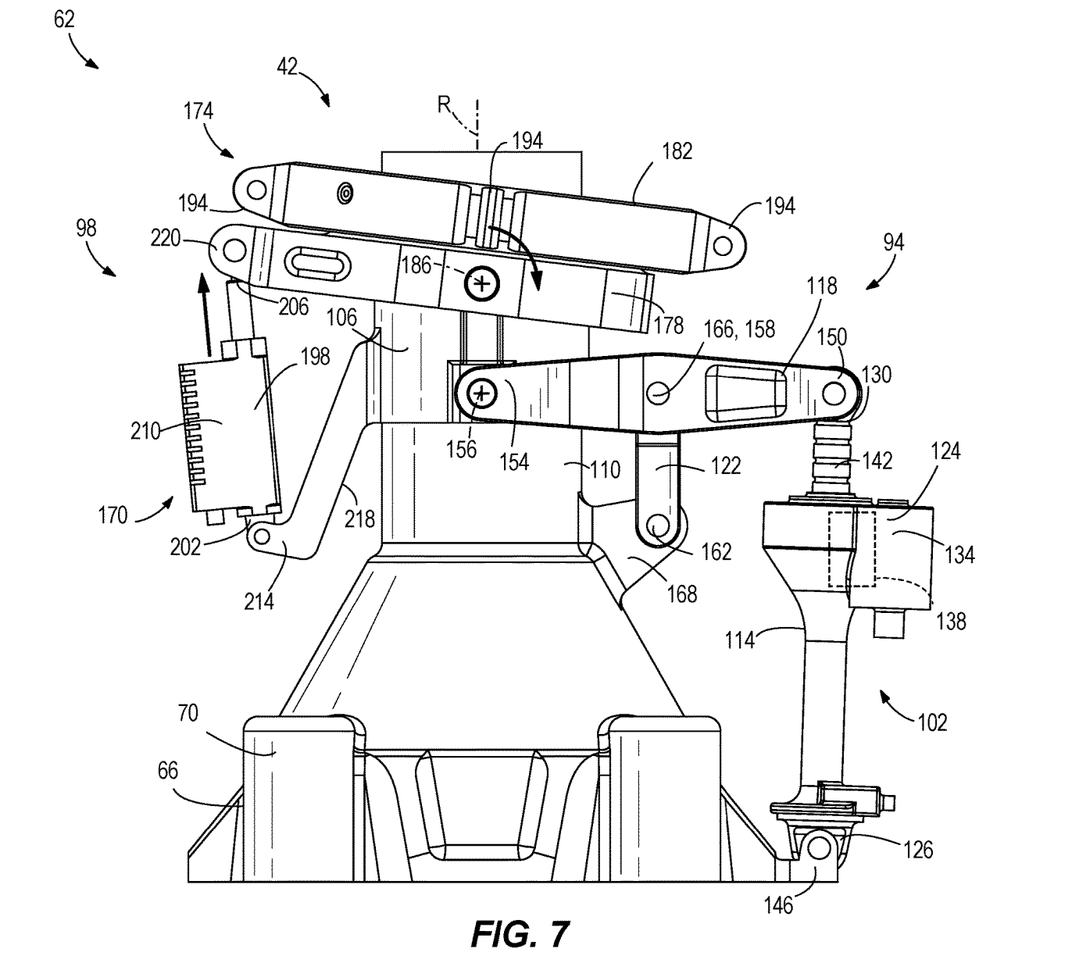
FIG. 7 is a side view of the pitch control system of FIG. 3 illustrating the pitch control system during a cyclic pitch change.

With reference to FIG. 7, to perform a cyclic pitch control operation, the pitch control system 62 operates the cyclic control assembly 98, and specifically the second actuator 170. In one example, the second EMA 210 expands and the length of the second link 198 is increased. The first end 202 of the second link 198 is coupled to the leg bracket 218, therefore the expansion of the second EMA 210 causes the second end 206 of the second link 198 to move away from the leg bracket 218. Movement of the second end 206 drives the swashplate assembly 174 to pivot about the tilt axis 186. The swashplate assembly 174 is fixed to rotate about the tilt axis 186, therefore the pivot bracket 220, and the second end 206 coupled thereto, travels along an arced pathway. The second link 198 pivots with respect to the slider 106 and the swashplate assembly 174 to account for the lateral deflection of the arced pathway. The rotation of the swashplate assembly 174 about the tilt axis 186 is transmitted to the pitch control rods 90 such that the pitch control rods 90 on the side of the swashplate assembly 174 nearer the second actuator 170 are higher than the pitch control rods 90 on the opposite side, and thus the blades 50 are driven to rotate about the respective blade axes B by different amounts so the blades 50 have a different pitch based on the respective position around the rotor hub 82.

When the swashplate assembly 174 is in a neutral position, the force generated by the rotor system 42 is generally aligned with the rotor axis R. When the swashplate assembly 174 is tilted about the tilt axis 186 the force generated by the rotor system 42 extends transverse to the rotor axis R.

Operation of the cyclic control assembly 98 is independent from operation of the collective control assembly 94, as the position of the slider 106 along the rotor axis R is not affected by the activation of the second actuator 170.

Thus, the pitch control system 62 independently controls the cyclic pitch and the collective pitch of the blade assembly 46 allowing for precise and efficient control of the thrusters 34. While the pitch control system 62 is described in reference to a rotor system 42 of a convertible aircraft 10, the pitch control system 62 is equally applicable to thruster and rotor systems on other aircraft requiring precise control and adaptable configurations.

Figure 8:
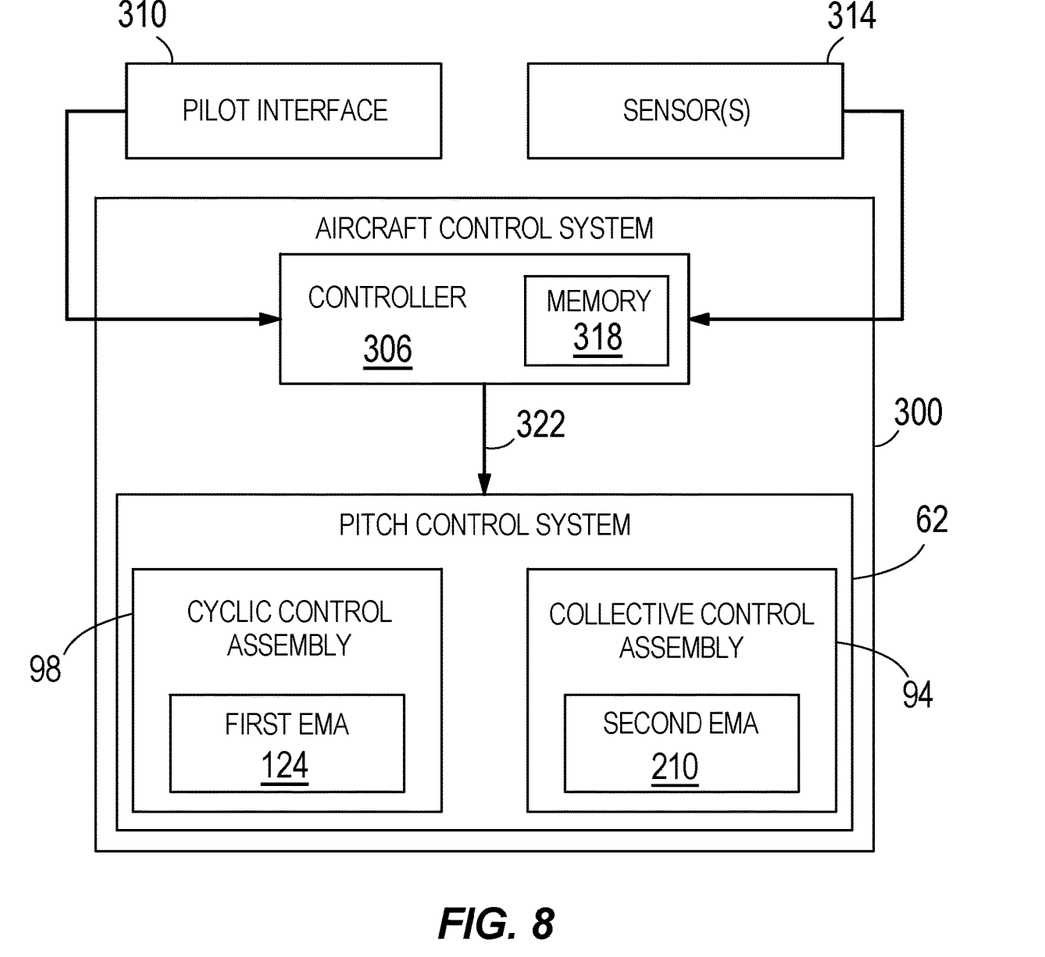
FIG. 8 illustrates a control system of the aircraft of FIG. 1 for controlling the pitch control system of FIG. 3.

With reference to FIG. 8, the pitch control system 62 is coupled to or part of an aircraft control system 300. The aircraft control system 300 includes a controller 306 that is coupled to pilot interface 310 and sensors 314. In some embodiments, the aircraft 10 includes a cockpit formed in the body 12 and the pilot interface 310 receives input from the pilot from onboard the aircraft 10. In some embodiments, the pilot interface 310 is a remote interface that is wirelessly connected to the controller 306 and the pilot wirelessly operates the aircraft control system 300 from a location remote from the aircraft 10. In some embodiments, the aircraft control system 300 is at least semi-automatic or autonomous and operates without input from a pilot, relying on programmed instructions (e.g., stored in a memory 318) and input from the sensors 314. The controller 306 may use the received input from the pilot interface 310 and the sensors 314 in combination with instructions stored in the memory 318 to determine a needed flight control adjustment. For example, sometimes the controller 306 may determine that one or more of the thrusters 34 needs to alter an amount of a generated force or a direction of application of the generated force. The controller 306 sends a control signal 322 to the pitch control system 62. The control signal 322 may include a first signal instructing the pitch control system to actuate the first actuator 102 (and specifically activate the first EMA 124 to expand or retract) or may include a second signal instructing the pitch control system 62 to actuate the second actuator 170 (and specifically activate the second EMA 210 to expand or retract). Because the first EMA 124 controls collective pitch changes and the second EMA 210 controls cyclic pitch changes, the pitch control system 62 and the overall aircraft control system 300 are able to control the collective and cyclic pitch of the blade assembly 46 separately, and the system does not require mechanical mixing. In some systems, having independent pitch change systems results in less complex signal processing. In some systems, having independent pitch change systems results in independent maintenance and easier identification of needed maintenance and repair. In some systems, having independent pitch change systems allows activation of only one actuator to achieve the needed adjustment without requiring activation of the non-adjusted system simply to maintain the non-adjusted pitch.

The pitch control system 62 described herein is capable of achieving precise control of the aircraft 10 through the forces generated by the rotor system 42 while maintaining an assembly of minimal complexity that is easy to repair and service. In the illustrated embodiment, the first actuator 102 and the second actuator 170 are positioned on directly opposite sides of the main shaft 74, and each lie within a plane that intersects the rotor axis R. Thus, the pitch control system 62 has a minimal footprint, allowing the nacelle 38 to be small in size, decreasing drag of the thruster 34. In other embodiments, the pitch control system 62 may be otherwise arranged to create a desired footprint shape.

The lever style configuration of the first actuator 102 advantageously allows for precise and quick control of the slider 106. As discussed above, the fulcrum point 158 of the lever arm 118 can be selected to create a desired mechanical advantage. In some embodiments, the fulcrum point 158 is closer to the first lever end 150 and a small variation in the length of the first link 114 achieves a large translation of the slider 106. This may allow for rapid changes in the collective pitch of the blade assembly 46. In some embodiments, the fulcrum point 158 is closer to the second lever end 154 and a large variation in the length of the first link 114 achieves a small translation of the slider 106. This may allow for precise control of the collective pitch of the blade assembly 46. The position of the fulcrum point 158 may be selected based on the capability of the first EMA 124 (e.g., the range, the resolution, the torque, the speed, etc.), as well as other factors of the collective control assembly 94. Additionally, as mentioned above, the configuration of the first actuator 102 allows for lateral deflection of the lever arm 118 during rotation thereof, to allow the second lever end 154 to travel linearly along the rotor axis R. Thus, movement is transmitted through an 'on-axis' force applied by the lever arm 118 to the slider 106 along the rotor axis R. This creates a more efficient transmission of power as it decreases or removes any lateral components to the force applied by the lever arm 118 to the slider 106. Such lateral components may result in higher friction or sticking during movement, decreasing the precision of the pitch control system 62.

The pitch control system 62 described herein also offers significant advantages over typical control systems that include mechanical mixing (e.g., using a set of actuators to achieve both collective and cyclic pitch). The collective pitch control and the cyclic pitch control are completely independent, such that operation of the first actuator 102 (including the first EMA 124) changes the collective pitch of the blade assembly 46 but does not change the cyclic pitch. In other words, the orientation of the swashplate assembly 174, and therefore the cyclic pitch of the blade assembly 46, is independent from operation of the first actuator 102. Specifically, the first EMA 124 can be activated to change the collective pitch and the second EMA 210 can remain inactive during the collective pitch change operation without affecting the cyclic pitch of the blade assembly 46. This increases the efficiency of the system, because the second EMA 210 does not need to be activated during the collective pitch change operation. The reverse is also true, that the first EMA 124 may remain inactive while the second EMA 210 is activated to change the cyclic pitch without altering the collective pitch. In other words, the position of the slider, and therefore the collective pitch of the blade assembly 46, is independent from operation of the second actuator 170. Because the first EMA 124 and second EMA 210 are independent, they can be selected based on specific requirements of the respective systems. For example, the first EMA 124 may be larger and capable of applying more force and varying the length of the first link 114 within a wider range, to be able to apply the needed force to move the slider 106 along the main shaft 74. The second EMA 210 may be smaller and have a higher resolution to allow more precise control of the tilting of the swashplate assembly 174 and smaller changes in length of the second link 198. Additionally, the electronic control of the pitch control system 62 is simplified by the use of independent actuators 102, 170.

Embodiments disclosed herein are primarily for exemplary purposes. It should be understood that alternative embodiments or various combinations of features described herein may be implemented.

Various features and advantages of the embodiments described herein are set forth in the following claims.

What is claimed is:

1. An aircraft comprising:
a body including a fuselage and a wing assembly;
a main shaft supported at the body for rotation with respect to the body about a rotor axis;
a blade assembly coupled to the main shaft for corotation therewith, the blade assembly including a rotor hub and a plurality of blades circumferentially spaced about the rotor hub, each blade coupled to the rotor hub for rotation about a respective blade axis;
a pitch control system coupled to the blade assembly to rotate each blade about the respective blade axis, the pitch control system including
a slider coupled to the main shaft for translation along the rotor axis, wherein translation of the slider rotates each blade about the respective blade axis by an equal amount;
a swashplate assembly coupled to the slider for rotation about a tilt axis substantially perpendicular to the rotor axis, wherein rotation of the swashplate assembly about the tilt axis rotates each blade about the respective blade axis by a different amount,
a first actuator coupled to the slider, the first actuator including
a first link pivotally coupled to the body,
a pivot link pivotally coupled to the body and defining a pivot point movable with respect to the body, and
a lever arm rotatably coupled to the pivot link for rotation about the pivot point according to movement of the first link, and
a second actuator operable to rotate the swashplate assembly with respect to the slider, the second actuator including a second link pivotally coupled to the slider and pivotally coupled to the swashplate assembly;
wherein the first link is configured to vary a length thereof to rotate the lever arm about the pivot point and translate the slider along the rotor axis; and
wherein the second link is configured to vary a length thereof to rotate the swashplate assembly about the tilt axis,
wherein the lever arm extends between a first lever end, coupled to the first link, and second lever end, coupled to the slider, and the pivot point is positioned between the first lever end and the second lever end.

2. The aircraft of claim 1, wherein the blade assembly is configured to generate a force based on an orientation of each blade about the respective blade axis, and wherein the force may apply lift, thrust, or a combination of lift and thrust to the aircraft.

3. The aircraft of claim 1, wherein the second lever end travels along a linear path parallel to the rotor axis and the pivot point travels along an arced path.

4. The aircraft of claim 1, wherein the second lever end applies a force to the slider in a direction parallel to the rotor axis.

5. The aircraft of claim 1, wherein the first link includes a first electro-mechanical actuator and wherein the second link includes a second electro-mechanical actuator, and wherein the first electro-mechanical actuator operates independently of the second electro-mechanical actuator.

6. The aircraft of claim 5, wherein an orientation of the swashplate assembly is independent from operation of the first actuator.

7. The aircraft of claim 5, wherein a position of the slider is independent from operation of the second actuator.

8. The aircraft of claim 1, wherein the first link and the pivot link are coupled to a gearbox casing positioned within the body, and wherein the main shaft extends from the gearbox casing along the rotor axis.

9. The aircraft of claim 1, wherein the swashplate assembly includes a lower swashplate and an upper swashplate, wherein the lower swashplate is pivotally coupled to the slider for rotation about the tilt axis.

10. A pitch control system configured to change a pitch of a blade assembly mounted on a main shaft for rotation about a rotor axis, the pitch control system comprising:
a slider configured to be coupled to the main shaft for translation along the rotor axis;
a slider actuator operable to translate the slider with respect to the main shaft, wherein the slider actuator is mounted between a fixed body and the slider;
a swashplate assembly coupled to the slider for rotation about a tilt axis substantially perpendicular to the rotor axis, wherein the swashplate assembly substantially surrounds the slider; and
a swashplate actuator operable to rotate the swashplate assembly with respect to the slider, the swashplate actuator mounted between the slider and the swashplate assembly;
wherein the slider actuator and the swashplate actuator are independently operated.

11. The pitch control system of claim 10, wherein the slider and the slider actuator are part of a collective control assembly, and wherein the collective control assembly is operable to change the pitch of the blade assembly collectively.

12. The pitch control system of claim 11, wherein the swashplate assembly and the swashplate actuator are part of a cyclic control assembly, and wherein the cyclic control assembly is operable to change the pitch of the blade assembly cyclically.

13. The pitch control system of claim 12, wherein the collective control assembly is operable to vary an amount of the force provided by the blade assembly, and wherein the cyclic control assembly is operable to vary a direction of the force provided by the blade assembly.

14. The pitch control system of claim 10, wherein the swashplate actuator includes an actuator configured to vary a length thereof, and wherein varying the length of the actuator rotates the swashplate assembly about the tilt axis.

15. The pitch control system of claim 14, wherein the actuator is part of a link extending between a first end and a second end, and wherein the first end is coupled to the slider and the second end is coupled to the swashplate assembly.

16. The pitch control system of claim 10, wherein the slider actuator includes a first link coupled to the fixed body, a pivot link coupled to the fixed body and including a pivot point movable with respect to the fixed body, and a lever arm coupled to the first link and the pivot link to rotate about the pivot point.

17. The pitch control system of claim 16, wherein the first link includes an actuator configured to vary a length of the first link and wherein varying the length of the first link rotates the lever arm about the pivot point.

18. The pitch control system of claim 17, wherein rotation of the lever arm about the pivot link applies a force to the slider in a direction parallel to the rotor axis and translates the slider along the rotor axis.

19. An aircraft comprising:
a body;
a main shaft mounted in the body for rotation about a rotor axis;
a blade assembly coupled to an end of the main shaft and configured to provide a force to the body when rotated about the rotor axis, wherein the blade assembly has a pitch that varies and changes the force in response; and
a pitch control system according to claim 10, configured to move the blade assembly to change the pitch thereof.

* * * * *